United States Patent
Ono et al.

(10) Patent No.: US 7,117,968 B2
(45) Date of Patent: Oct. 10, 2006

(54) MOTOR DRIVEN VEHICLE AND METHOD OF SAMPLING MAP DATA OF THE MOTOR DRIVEN VEHICLE

(75) Inventors: Tomohiro Ono, Shizuoka (JP); Junji Terada, Shizuoka (JP); Atsushi Kurosawa, Shizuoka (JP); Hiroaki Yagi, Shizuoka (JP); Koushi Sasaki, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 341 days.

(21) Appl. No.: 10/683,898

(22) Filed: Oct. 10, 2003

(65) Prior Publication Data

US 2004/0074681 A1    Apr. 22, 2004

(30) Foreign Application Priority Data

Oct. 15, 2002    (JP) ............................. 2002-301055
Oct. 30, 2002    (JP) ............................. 2002-316426

(51) Int. Cl.
B62D 61/02    (2006.01)
(52) U.S. Cl. ..................................... 180/220; 180/65.1
(58) Field of Classification Search ................ 180/220, 180/65.1, 907
See application file for complete search history.

(56) References Cited

U.S. PATENT DOCUMENTS 5,806,621 A *    9/1998  Soda et al. ................. 180/206
6,048,289 A *    4/2000  Hattori et al. ................. 477/15
6,196,347 B1 *   3/2001  Chao et al. ................... 180/206
6,247,548 B1 *   6/2001  Hayashi et al. ............. 180/206
6,276,481 B1 *   8/2001  Matsuto et al. ............. 180/220
6,320,336 B1 *  11/2001  Eguchi ......................... 318/139
6,329,781 B1    12/2001  Matsui et al.
6,404,097 B1     6/2002  Pullen
6,446,745 B1 *   9/2002  Lee et al. .................... 180/206
6,598,693 B1 *   7/2003  Honda et al. ................ 180/205
2002/0120382 A1 * 8/2002  Hatanaka et al. ............. 701/70

FOREIGN PATENT DOCUMENTS

| DE | 101 46 376 | 9/2001 |
|---|---|---|
| EP | 0 731 361 | 9/1996 |
| EP | 1 124 322 | 8/2001 |
| EP | 1 247 687 | 10/2002 |
| JP | 06-133408 | 5/1994 |
| JP | 06-133409 | 5/1994 |

OTHER PUBLICATIONS

Agilent Technologies—Using a Function Generator to Create PWM Waveforms (Application Note 1466) dated Jul. 21, 2003.*

* cited by examiner

Primary Examiner—Tony Winner
(74) Attorney, Agent, or Firm—Hogan & Hartson LLP

(57) ABSTRACT

A motor driven vehicle includes an electric motor that drives wheels through a power source and an electric motor control unit that drives the electric motor. When a voltage of the power source is a predetermined value or greater, the electric motor control unit controls the electric motor such that rotational speed-torque characteristics that the electric motor has are maintained when the voltage of the power source is at the predetermined value.

18 Claims, 9 Drawing Sheets

MOTOR DRIVEN VEHICLE AND METHOD OF SAMPLING MAP DATA OF THE MOTOR DRIVEN VEHICLE

BACKGROUND OF THE INVENTION

1. Field of the Invention

This invention relates to a motor driven vehicle capable of providing a constant running performance when the power source voltage is a predetermined value or greater, and a method of sampling map data of the motor driven vehicle.

2. Description of Related Art

A conventional electric motorcycle does not have N-T characteristics in response to the power source voltage, and thus a stable running performance is difficult to obtain. Therefore, an aspect of the present invention is to provide a motor driven vehicle capable of providing a constant running performance when the power source voltage is a predetermined value or greater.

SUMMARY OF THE INVENTION

In order to solve the foregoing problem in the prior art, one embodiment of the present invention includes a motor driven vehicle having an electric motor for driving wheels through a power source, and an electric motor control unit for driving the electric motor. When the voltage of the power source is a predetermined value or greater, the electric motor control unit controls the electric motor such that rotational speed-torque characteristics that the electric motor has are maintained when the voltage of the power source is at the predetermined value.

The electric motor control unit is provided with at least one of a map of the voltage of the power source, the rotational speed and the torque component current of the electric motor and a map of the voltage of the power source. Control of the rotational speed and the magnetic flux component current of the electric motor is performed by varying at least one of the torque component current and the magnetic flux component current by referring to the map provided.

The control by the electric motor control unit is performed by mechanically varying the magnetic flux of the electric motor.

The power source is a battery. The motor driven vehicle has a temperature detection unit that detects a temperature of the battery, and the electric motor control unit is adapted to vary the magnetic flux component current of the electric motor using the temperature detected by the temperature detection unit.

This invention provides a way of sampling map data of a motor driven vehicle, having a stage at which the voltage of a DC power source connected to an electric motor for driving the motor driven vehicle is set at a reference value, and data of rotational speed-torque characteristics, a rotational speed-torque current command value map and a rotational speed-field current command value map are sampled when the voltage of the DC power source is at the reference value, while a torque current command value and a field current command value of the electric motor are adjusted such that desired rotational speed-torque characteristics are obtained with the current from the DC power source not exceeding a predetermined current value. A stage at which the voltage of the DC power source is set at a value larger than the reference value, and data of a rotational speed-torque current command map and a rotational speed-field current command map are sampled when the voltage of the DC power source is at the larger value, while the torque current command value and the field current command value are adjusted such that the rotational speed-torque characteristics obtained at the stage for the reference value are obtained with the current from the DC power source does not exceeding the current value.

DETAILED DESCRIPTION OF THE PREFERRED EMBODIMENTS

Now, an embodiment of this invention is described with reference to the drawings.

Figure 1:
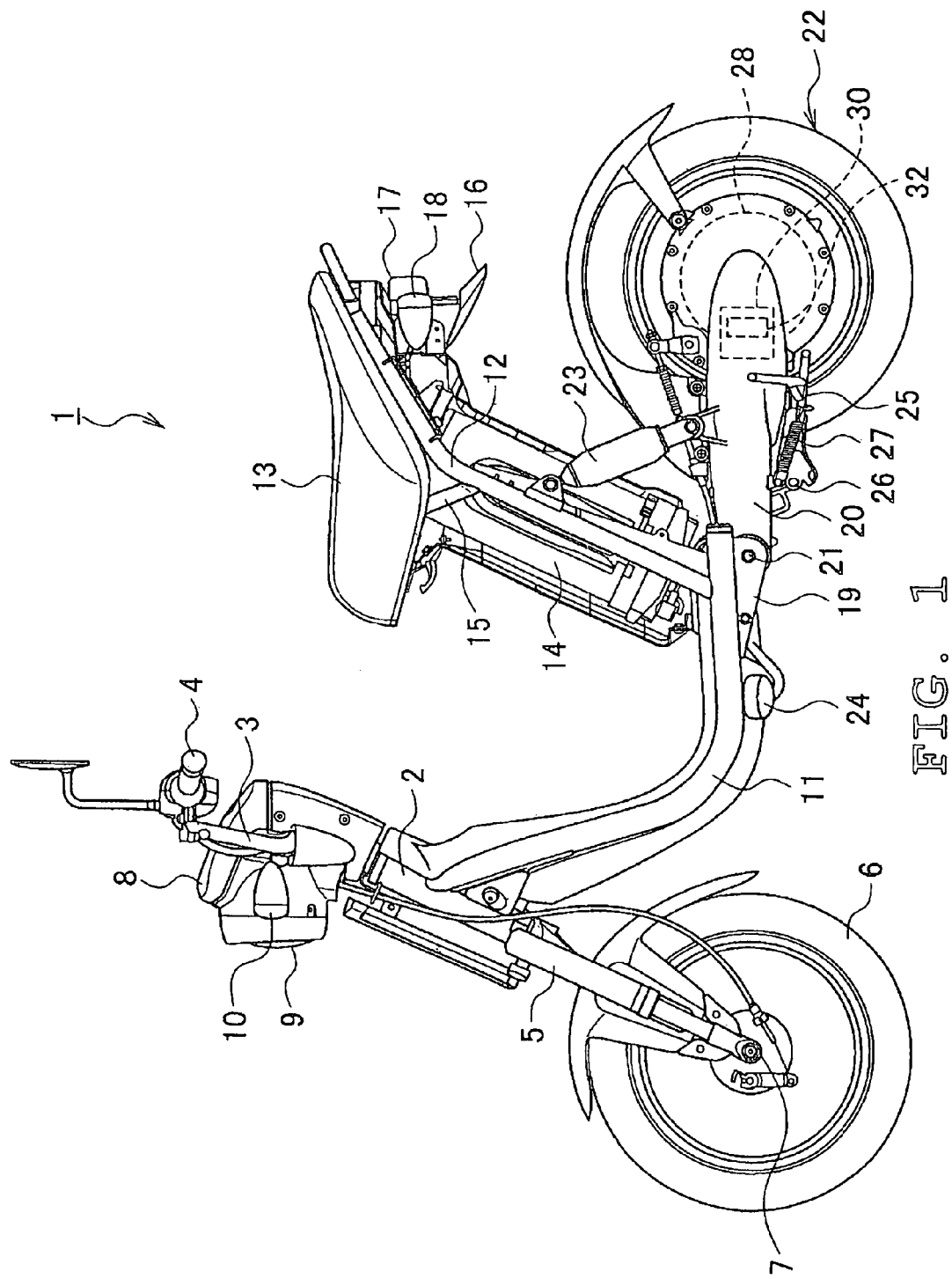
FIG. 1 is a side view of an electric motorcycle embodying this invention.

FIG. 1 is a side view of an electric motorcycle embodying this invention.

An electric motorcycle 1 shown in FIG. 1, includes a head pipe 2 at the upper front of its body, and in the head pipe 2 is inserted a steering shaft (not shown) for rotation. To the upper end of the steering shaft is attached a handle 3. At both ends of the handle 3 are fitted grips 4, and a grip 4 (not shown) on the right side (on the inner side on FIG. 1) constitutes a rotatable throttle grip (hereinafter referred to as a throttle 4A).

At the bottom of the head pipe 2 is mounted an upper part of a pair of left and right front forks 5, and at the lower ends of the front forks 5 is supported a front wheel 6 by a front axle 7 for rotation. In the upper central part of the handle 3 is disposed a meter 8. Downwardly of the meter 8 is disposed a head lamp 9, and on both sides of the head lamp are provided flasher lamps 10, respectively (only one is shown in FIG. 1).

A pair of body frames 11 are disposed extending from the head pipe 2 toward the rear. That is, the body frame 11 is of a round tubular shape, and after extending obliquely downwardly toward the rear from the head pipe 2, it is bent in an arc toward the rear and extends rearward approximately horizontally. A pair of left and right body frames 12 are provided extending obliquely upwardly from the rear ends of the body frames 11, which are connected together at the back of a seat 13. Between the pair of left and right body frames 12 is disposed a battery 14.

To the left and right body frames 12 is connected a seat stay (not shown) in the shape of an inverse letter U, which is supported by left and right stays 15 (only one is shown in the figure). On the seat stay is disposed the seat 13 for opening.

On the rear face of a rear fender 16 attached to the rear end of the body frames 12 is attached a tail lamp 17, on both sides of which are disposed flasher lamps 18 (only one is shown in the figure).

On the other hand, to the rear ends of the left and right body frames 11 are welded a pair of left and right rear arm brackets 19 (only one is shown in the figure), and on the rear arm brackets 19 is supported a forward end of a rear arm 20 by a pivot shaft 21 for swinging movement. To the rear end of the rear arm 20 is fitted a drive wheel, or a rear wheel 22, for rotation, and the rear arm 20 and the rear wheel 22 are suspended from the body frame 12 by a rear cushion 23.

Downwardly of the left and right body frames 11 are mounted foot steps 24 (only one is shown in the figure), respectively, and to the bottom of the rear arm 20 is pivotally mounted a side stand 25 by a shaft 26 for pivotal movement, which stand is urged by a return spring 27 toward closing.

In an approximately circular portion at the rear end of the rear arm 20 is housed a laterally flat and thin electric motor 28 of an axial gap type. Also, adjacent to the electric motor 28 are housed an electric motor control unit 30 for controlling the electric motor 28, and an encoder 32 for detecting the position of rotation of the rotor of the electric motor 28.

Figure 2:
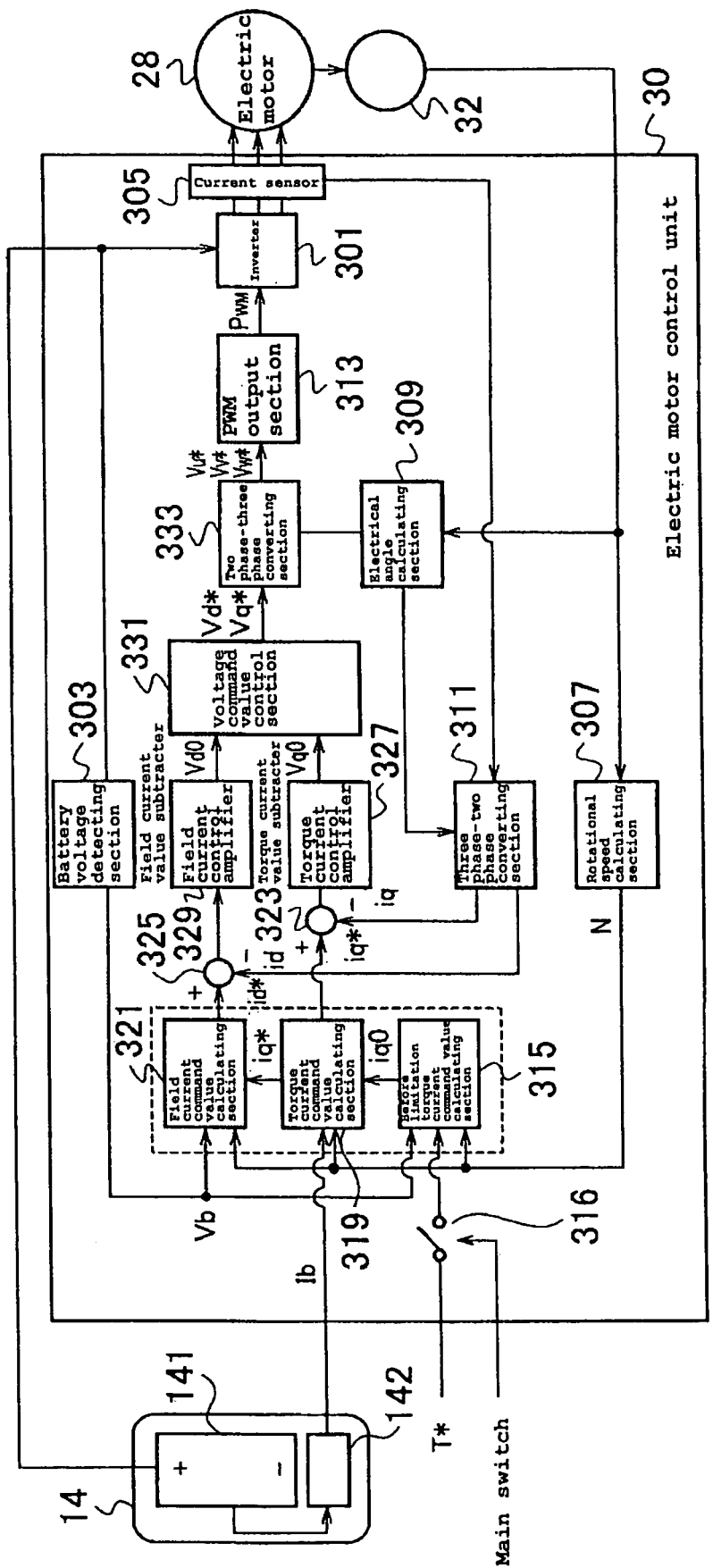
FIG. 2 is an electric circuit diagram of the electric motorcycle 1.

FIG. 2 is an electric circuit diagram of the electric motorcycle 1. As shown in the figure, the electric motor control unit 30 is a unit for controlling the operation of the electric motor 28, and includes an inverter 301 for converting a DC voltage from a battery cell 141 of a battery 14 (a fuel cell may also be used) into a three phase AC voltage to be supplied to the electric motor 28, and a battery voltage detecting section 303 for detecting a voltage (battery voltage) VB of the battery 14.

Also, the electric motor control unit 30 includes a current sensor 305 for detecting current values iu, iv of the currents flowing in the U-phase and V-phase wires connected to the electric motor 28, a rotational speed calculating section 307 for calculating a rotational speed N of the electric motor 28 based on the detection result by the encoder 32 for detecting the rotor position of the electric motor 28 and an electrical angle calculating section 309 for calculating an electrical angle θ of the rotor of the electric motor 28, based on the angular velocity ω of the electric motor 28 measured based on the measurement result by the encoder 32. Also, included is a three phase-two phase converting section 311 for determining two phase current measurement values, or a torque current measurement value iq and a field current measurement value id, based on the electrical angle θ and the current values iu, iv detected by the current sensor 305.

Also, the electric motor control unit 30 includes a PWM output section 313 for generating a PWM signal, for the output to the inverter 301, based on the battery voltage value Vb measured by the battery voltage detecting section 303 and the three phase voltage command values Vu*, Vv*, Vw* from a two phase-three phase converting section 333 (described later).

Also, the electric motor control unit 30 includes a before limitation torque current command value calculating section 315 for calculating, for the output, a torque current command value before limitation by a battery current value Ib, or a before limitation torque current command value iq0, from a torque current value T* corresponding to the amount of rotation of the throttle 4A and the rotational speed N of the electric motor 28 determined by the rotational speed calculating section 307.

In the transmission path of the torque command value T* from the throttle 4A to the before limitation torque current command value calculating section 315 is provided an emergency stop switch section 316 for opening/closing by manual operation, for example, a main switch for use in starting the electric motorcycle 1 or a special stop switch.

In addition, there is provided a torque current command value calculating section 319 in which a current value (battery current value) Ib of the current flowing out from the battery 14 is supplied from the BMC 142, and a torque current command value iq* is calculated, for the output, based on this battery current value Ib, the rotational speed N and the battery voltage value Vb.

Further, there is provided a field current command value calculating section 321 for calculating, for the output, a field current command value id*, based on the torque current command value iq* outputted from the torque current command value calculating section 319 and the rotational speed N.

Furthermore, a torque current subtracter 323 for subtracting the torque current measurement value iq determined by the three phase-two phase converting section 311 from the torque current command value iq* outputted from the torque current command value calculating section 319, and a field current value subtracter 325 for subtracting the field current measurement value id determined by the three phase-two phase converting section 311 from the field current command value id* outputted from the field current command value calculating section 321 are also provided.

Moreover, a torque current control amplifier 327 for determining a before limitation torque voltage command value Vq0 before the limitation by a voltage command value limiting section 331 (described later), based on the subtracted result by the torque current value subtracter 323, and a field current control amplifier 329 for determining a before limitation field voltage command value Vd0 based on the subtracted result by the field current subtracter 325 are also provided.

Yet further, there is provided a voltage command value limiting section 331 for determining, as two phase voltage command values, a torque voltage command value Vq* which is the before limitation torque voltage command value Vq0 from the torque current control amplifier 327 limited such that it does not exceed a predetermined maximum value, and a field voltage command value Vd* which is the before limitation field voltage command value Vd0 from the field current control amplifier 329 limited such that it does not exceed a predetermined maximum value.

Still further, there is provided a two phase-three phase converting section 333 for determining three phase voltage command values Vu*, Vv*, Vw* by two phase-three phase conversion, for the output to the PWM output section 313, based on the two phase voltage command values outputted from the voltage command value limiting section 331, or the torque voltage command value Vq* and the field voltage command value Vd*, and the electrical angle θ determined by the electrical angle calculating section 309.

Figure 3:
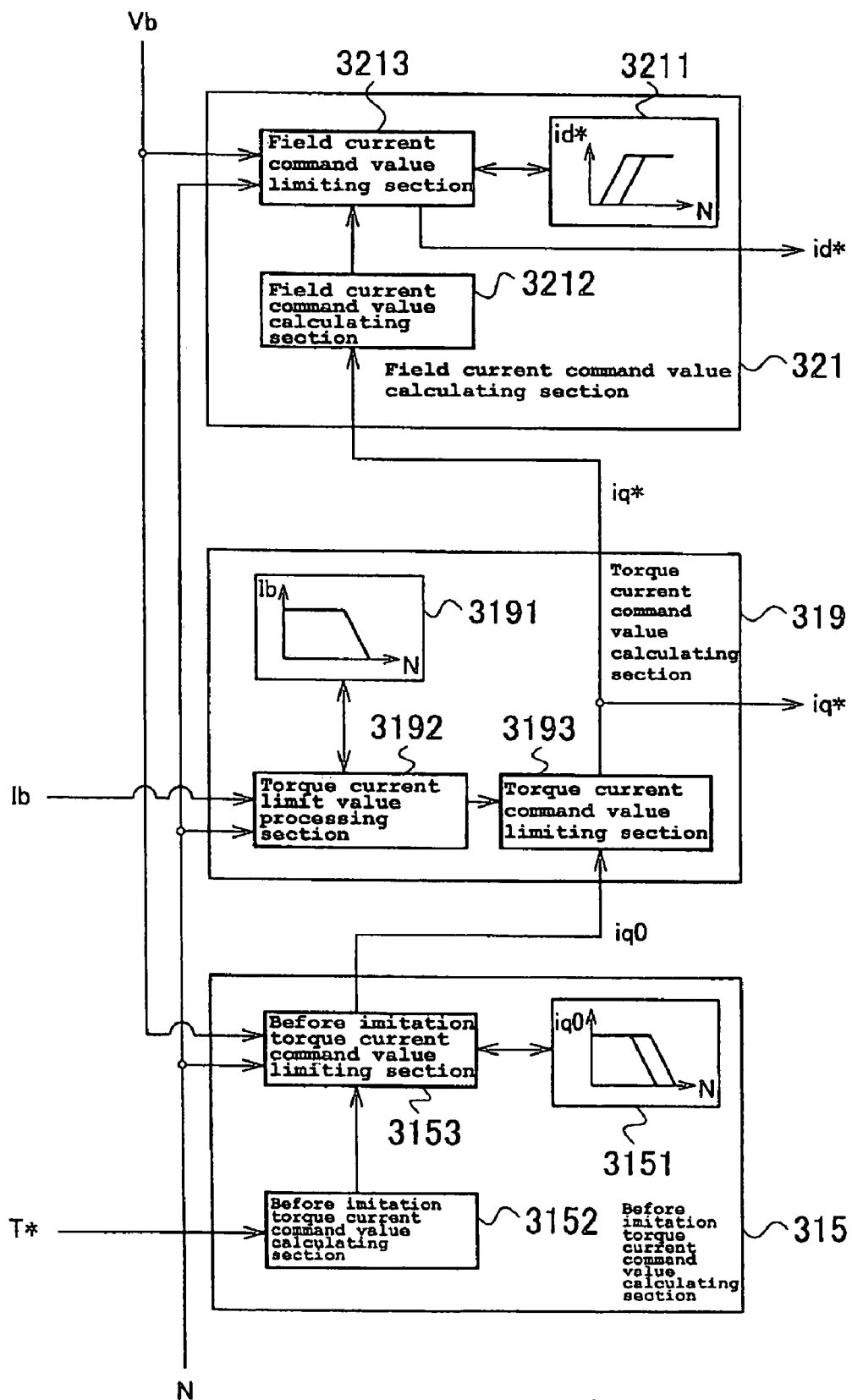
FIG. 3 is a detailed view of a portion in the electric circuit diagram of FIG. 2.

FIG. 3 is a detailed view of a portion enclosed by the dash line of FIG. 2.

The before limitation torque current command value calculating section 315 includes an iq0 map storage section 3151 having an N-iq0 map in which correspondence of the rotational speed N to the maximum value of the before limitation torque current command valuy iq0 is established, for each of a plurality of battery voltage values Vb, a before limitation torque current command value calculating section 3152 for calculating a before limitation torque current command value iq0 such that it increases with an increase in the torque command value T*, and a before limitation torque current command value limiting section 3153 in which a battery voltage value Vb is interpolated as required using the battery voltage value Vb from the battery voltage detecting section 303 and the N-iq0 maps in the iq0 map storage section 3151, to determine a maximum value of the before limitation torque current command value iq0 at the battery voltage value Vb calculated in the rotational speed calculating section 307. Only if the before limitation torque current command value iq0 calculated in the before limitation torque current command value calculating section 3152 exceeds the determined maximum value, the maximum value is determined as a before limitation torque current command value iq0, which value iq0 is outputted.

The torque current command value calculating section 319 includes a battery current value map storage section 3191 having a N-Ib map in which correspondence of the rotational speed N to the maximum value of the battery current value Ib is established and a torque current limit value processing section 3192 for calculating a limit value of the before limitation torque current command value iq0, based on the battery current value Ib and the rotational speed N from the BMC 142 and the N-Ib map of the battery current value map storage section 3191. The torque current command value calculating section 319 also includes a torque current command value limiting section 3193 in which if a before limitation torque current command value iq0 from the before limitation torque current command value calculating section 315 is not larger than the limit value, the before limitation torque current command value iq0 is determined as a torque current command value iq*, while if the before limitation torque current command value iq0 exceeds the limit value, the limit value is determined as a torque current command value iq*, which values iq* are outputted.

The field current command value calculating section 321 includes an id* map storage section 3211 having an N-id* map in which correspondence of the rotational speed N to the maximum value of the field current command value id* is established, for each of a plurality of battery voltage values Vb, a field current command value calculating section 3212 for calculating a field current command value id* such that it decreases with an increase in the torque current command value iq*, and a field current command value limiting section 3213 in which a battery voltage value Vb is interpolated as required using the battery voltage value Vb from the battery voltage detecting section 303 and the N-id* maps in the id* map storage section 3211, to determine a maximum value of the field current command value id* at the battery voltage Vb calculated in the rotational speed calculating section 307. Only if the field current command value id* calculated in the field current command value calculating section 3212 exceeds the determined maximum value, the maximum value is determined as a field current command value id*, which value id* is outputted.

Figure 4:
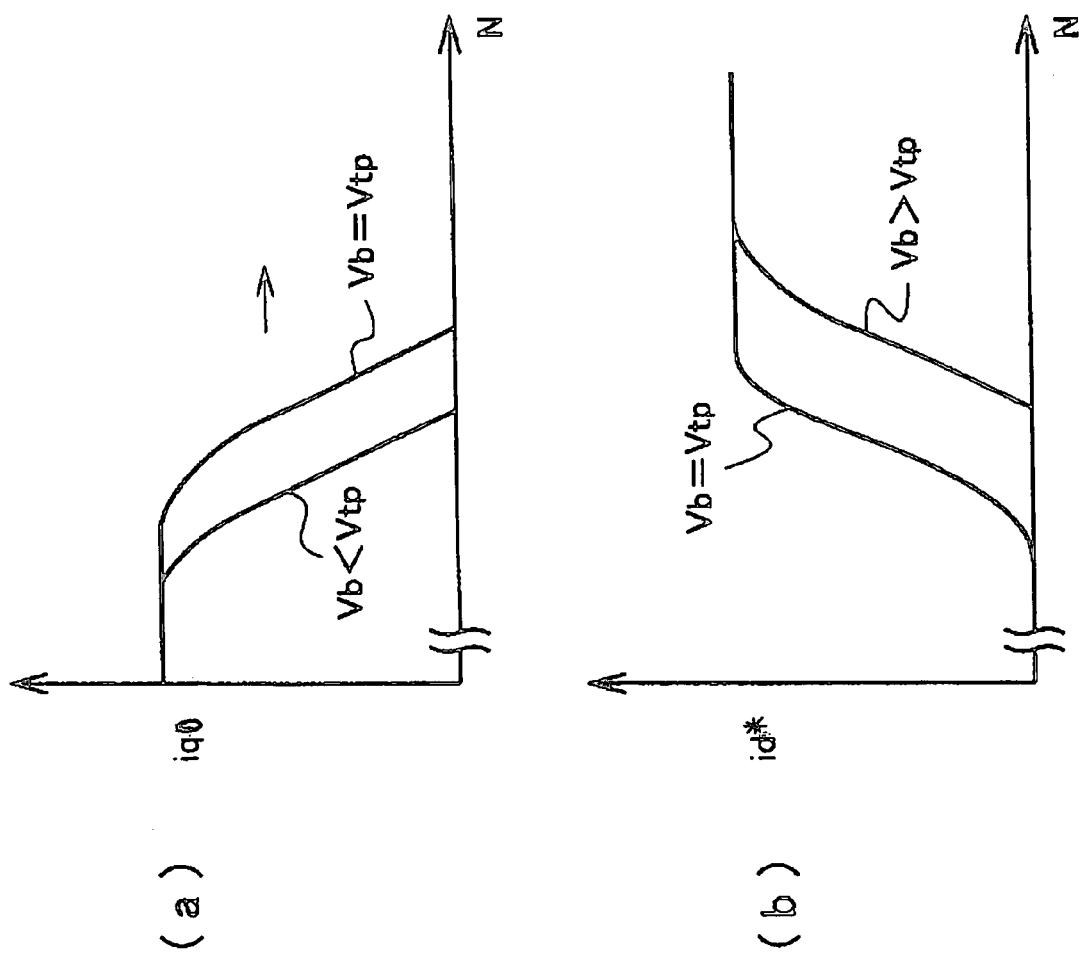
FIG. 4(*a*) is a graph showing N-iq0 maps and FIG. 4(*b*) is a graph showing N-id* maps.

FIG. 4(*a*) is a graph showing a plurality of N-iq0 maps stored for different battery voltage values Vb in the iq0 map storage section 3151. FIG. 4(*b*) is a graph showing a plurality of N-id* maps stored for different battery voltage values Vb in the id* map storage section 3211.

The iq0 map storage section 3151 stores N-iq0 maps in which correspondence of a plurality of sampled rotational speeds N to maximum values of before limitation torque current command values iq0 at the rotational speeds is established, as shown in FIG. 4(*a*), one of which is for a battery voltage value Vb being equal to the battery voltage reference value Vtp (Vb=Vtp) and a plurality of which are for battery voltage values Vb being greater than the battery voltage reference value Vtp (Vb>Vtp). The battery voltage reference value Vtp is smaller than the maximum voltage of the battery 14.

In each of all the N-iq0 maps, the before limitation torque current command value iq0, which has a stationary value in a low rotation range, falls in a rotational range higher than that, and is decreased to zero in a rotation range higher than the higher rotation range. However, the map is arranged such that the falling rotation range becomes higher for a higher battery voltage value Vb.

The iq0 map storage section 3151 stores no N-iq0 map for a battery voltage value Vb smaller than the battery voltage reference value Vtp (Vb<Vtp), so that the iq0 map storage section 3151 can be constituted by a memory of small storage capacity.

The id* map storage section 3211 stores N-id* maps in which correspondence of a plurality of sampled rotational speeds N to maximum values of field current command values id* at the rotational speeds is established, as shown in FIG. 4(*b*), one of which is for a battery voltage value Vb being equal to the battery voltage reference value Vtp (Vb=Vtp) and a plurality of which are for battery voltage values Vb exceeding the battery voltage reference value Vtp (Vb>Vtp).

In each of all the N-id* maps, the field current command value id*, which is zero in a low rotation range, rises in a rotational range higher than that, and is increased to a stationary value in a rotation range higher than the higher rotation range. Also, the N-id* map is arranged such that the rising rotation range becomes higher for a higher battery voltage value Vb.

The id* map storage section 3211 stores no N-id* map for a battery voltage value Vb being smaller than the battery voltage reference value Vtp (Vb<Vtp), so that the id* map storage section 3211 can be constituted by a memory of small storage capacity.

Now, operation of the electric motorcycle 1, in particular of the electric motor control unit 30, will be described.

The inverter 301 converts a DC voltage from the battery cell 141 of the battery 14 into a three phase AC voltage and supplies it to the electric motor 28. The battery voltage detecting section 303 detects a battery voltage value Vb of the battery 14.

The current sensor 305 detects current values iu, iv of the current flowing in the u-phase and the v-phase wire connected to the electric motor 28.

The rotational speed calculating section 307 calculates a rotational speed N of the electric motor 28 based on the detection result by the encoder 32 for detecting the rotor position of the electric motor 28.

The electrical angle calculating section 309 calculates an electrical angle θ of the rotor of the electric motor 28 based on the angular velocity ω of the electric motor 28 measured based on the measurement result by the encoder 32.

The three phase-two phase converting section 311 determines a torque current measurement value iq and a field current measurement value id, based on this electrical angle θ and the current values iu, iv detected by the current sensor 305.

The before limitation current command value calculating section 315 calculates a before limitation current command value iq0 from the torque command value T* corresponding to the amount of rotation of the throttle 4A and the rotational speed N of the electric motor 28 calculated in the rotational speed calculating section 307, for the output to the torque current command value calculating section 319.

Specifically, in the before limitation torque current command value calculating section 315, first the before limitation torque current command value calculating section 3152 calculates a before limitation current command value iq0 such that it increases along with an increase in the torque command value T*. If the emergency stop switch section 316 is open, the torque command value T* is not inputted and in turn the electric motor 28 does not operate, so that a braking action can be performed easily.

Then, the before limitation torque current command value limiting section 3153 interpolates a battery voltage Vb as required using the battery voltage value Vb from the battery voltage detecting section 303 and the N-iq0 maps in the iq0 map storage section 3151, and determines a maximum value of the before limitation torque current command value iq0 at the battery voltage value Vb calculated in the rotational speed calculating section 307.

Then, in the before limitation torque current command value limiting section 3153, only if the before limitation torque current command value iq0 calculated in the before limitation torque current command value calculating section 3152 exceeds the determined maximum value, the maximum value is determined as a before limitation torque current command value iq0, while if the before limitation torque current command value does not exceed the maximum value, the calculated before limitation torque current command value iq0 is determined as a final before limitation torque current command value iq0, and the before limitation torque current command values determined as described above are outputted to the torque current command value calculating section 319.

The torque current command value calculating section 319 calculates a torque current command value iq*, based on the battery current value Ib from the BMC 142, the rotational speed N and the battery voltage value Vb, which command value iq* is outputted to the field current command value calculating section 321 and the torque current value subtracter 323.

Specifically, in the torque current command value calculating section 319, the torque current limit value processing section 3192 determines a limit value of the before limitation torque current command value iq0, based on the battery current value Ib from the BMC 142, the rotational speed N and the N-Ib map in the battery current value map storage section 3191.

The limit value iq*lim of the before limitation torque current command value iq0 is determined by the following processing.

Mathematics 1 iq*lim=iq*max Rq(t),
where
Rq(t)=Rq(t−1), when |Iblim(N)<Ib(t) |<Ib(DB)
Rq(t)=Rq(t−1)+K1 (Iblim(N)-Ib(t)), when Iblim(N)<Ib(t),
Rq(t)=Rq(t−1)+K2 (Iblim(N)-Ib(t)), when Iblim(N)≧Ib(t), and
Rq(t)=100%.

iq*max, K1 and K2 are values stored in advance in the torque current limit value processing section 3192 when a judgment is made that the vehicle has stopped. Iblim(N) is determined from the N-Ib map, based on the rotational speed N. Ib(DB) is Ib determined from the N-Ib map when the rotational speed N=DB.

Then, in the torque current command value limiting section 3193, if a before limitation torque current command value iq0 from the before limitation torque current command value calculating section 315 is not larger than the limit value iq*lim, the before limitation torque current command value iq0 is determined as a torque current command value iq*, while if the before limitation torque current command value iq0 exceeds the limit value iq*lim, the limit value is determined as a torque current command value iq*, and the torque current command values iq* determined as described above are outputted to the field current command value calculating section 321 and the torque current value subtracter 323.

The field current command calculating section 321 calculates, for the output, a field current command value id*, based on the torque current command value iq* outputted from the torque current command value calculating section 319 and the rotational speed N.

Specifically, in the field current command value calculating section 321, the field current command value calculating section 3212 calculates a field current command value id* such that it decreases with an increase in the torque current command value iq*. That is, a so-called field weakening is performed.

In the field current command value limiting section 3213, a battery voltage value Vb is interpolated as required using the battery voltage value Vb from the battery voltage detecting section 303 and the N-id* maps from the id* map storage section 3211, to determine a maximum value of the field current command value id* at the battery voltage value Vb calculated in the rotational speed calculating section 307, and only if the field current command value id* calculated in the field current command value calculating section 3212 exceeds the determined maximum value, the maximum value is determined as a field current command value id*, which is outputted to the field current value subtracter 325.

Thereafter, the torque current value subtracter 323 subtracts the torque current measurement value iq determined in the three phase-two phase converting section 311 from the torque current command value iq* outputted from the torque current command value calculating section 319, and the field current value subtracter 325 subtracts the field current measurement value id determined in the three phase-two phase converting section 311 from the field current command value id* outputted from the field current command value calculating section 321.

The torque current control amplifier 327 determines a before limitation torque current command value Vq0 based on the subtraction result of the torque current value subtracter 323, and the field current control amplifier 329 determines a before limitation field voltage command value Vd0 based on the subtracted result by the field current value subtracter 325.

In the voltage command value limiting section 331, if a before limitation torque voltage command value Vq0 from the torque current control amplifier 327 does not exceed a predetermined maximum value, the before limitation torque voltage command value Vq0 is determined as a torque voltage command value Vq*, while if the before limitation torque voltage command value exceeds the maximum value, the maximum value is determined as a torque voltage command value Vq*. Also, in the voltage command value limiting section 331, if a before limitation field voltage command value Vd0 from the field current control amplifier 329 does not exceed a predetermined maximum value, the before limitation field voltage command value Vd0 is determined as a field voltage command value Vd*, while if the before limitation field voltage command value exceeds the maximum value, the maximum value is determined as a field voltage command value Vd*. The voltage command value limiting section 331 outputs the torque voltage command value Vq* and the field voltage command value Vd* determined as described above to the two phase-three phase converting section 333.

The two phase-three phase converting section 333 determines three phase voltage command values Vu*, Vv*, Vw* by two phase-three phase conversion, based on the torque voltage command value Vq* and the field voltage command value Vd* outputted from the voltage command value limiting section 331 and the electrical angle θ calculated in the electrical angle calculating section 309, which three phase voltage command values are outputted to the PWM output section 313.

The PWM output section 313 generates a PWM signal, based on the battery voltage value Vb measured in the battery voltage detecting section 303 and the three phase voltage command values Vu*, Vv*, Vw* supplied from the two phase-three phase converting section 333, which PWM signal is outputted to the inverter 301.

The inverter 301 converts a DC voltage supplied from the battery cell 141 of the battery 14 into a three phase AC voltage to be supplied to the electric motor 28.

Figure 5:
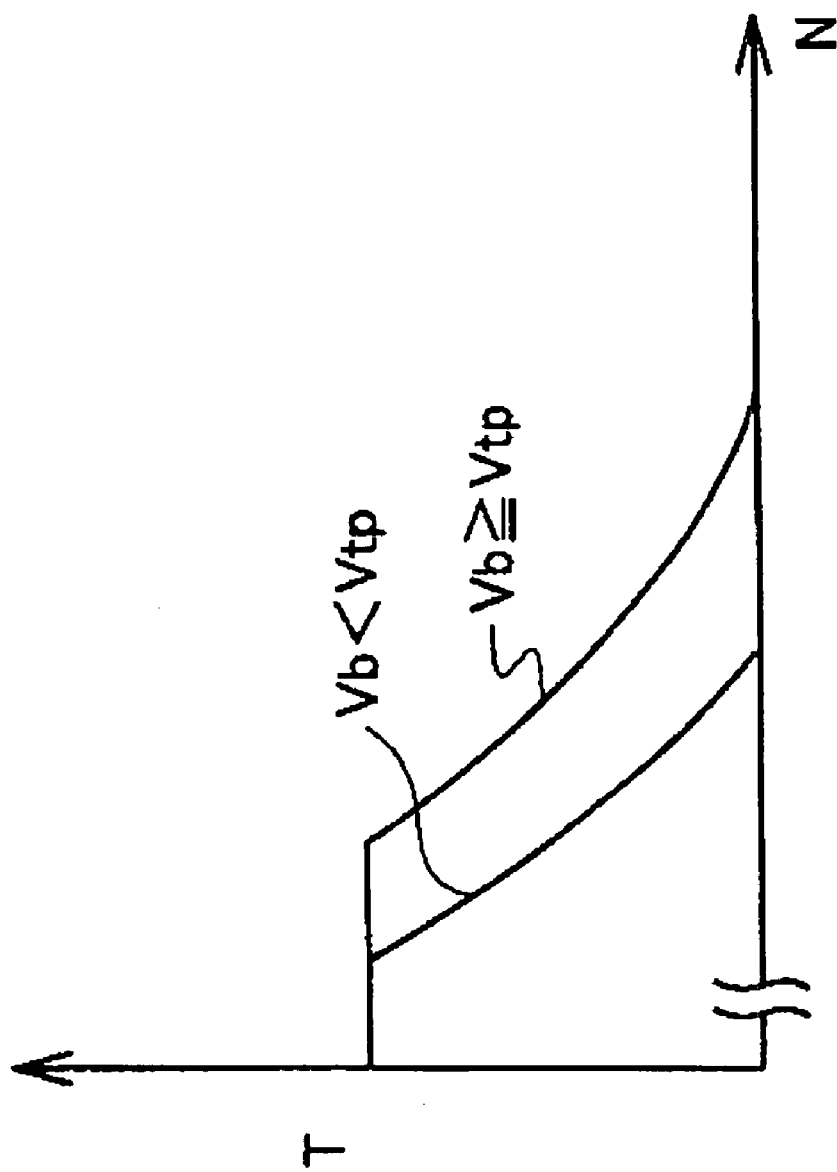
FIG. 5 is a graph showing rotational speed-torque characteristics of the electric motorcycle 1.

FIG. 5 is a graph showing the rotational speed-torque characteristics of the electric motorcycle 1. In this specification, the rotational speed-torque characteristics are obtained at the time of full throttling and abbreviated as N-T characteristics.

The N-T characteristics show that the torque T, which has a stationary vale in a low rotation range, falls in a rotation range higher than that, and is decreased to zero in a rotation range higher than the higher rotation range. This is a tendency shown by all the N-T characteristics irrespective of the battery voltage value Vb.

However, the N-T characteristics are the same whenever the battery voltage value Vb is not smaller than a battery voltage reference value Vtp (Vb≧Vtp). This is because the before limitation torque current command value iq0 is determined such that it does not exceed the N-iq0 map value shown in FIG. 4(a), and the field current command value id* is determined such that it does not exceed the N-id* map value shown in FIG. 4(b).

On the other hand, the N-T characteristics obtained when the battery voltage Vb is smaller than a battery voltage reference value Vtp (Vb<Vtp), have a tendency that the falling rotation range becomes lower for a smaller battery voltage value Vb.

Therefore, in the electric motorcycle 1, a constant running performance can be obtained when the battery voltage value Vb is not smaller than a battery voltage reference value Vtp, while running performance in response to the battery voltage value Vb can be obtained when the battery voltage value Vb is smaller than the battery voltage reference value Vtp.

Figure 6:
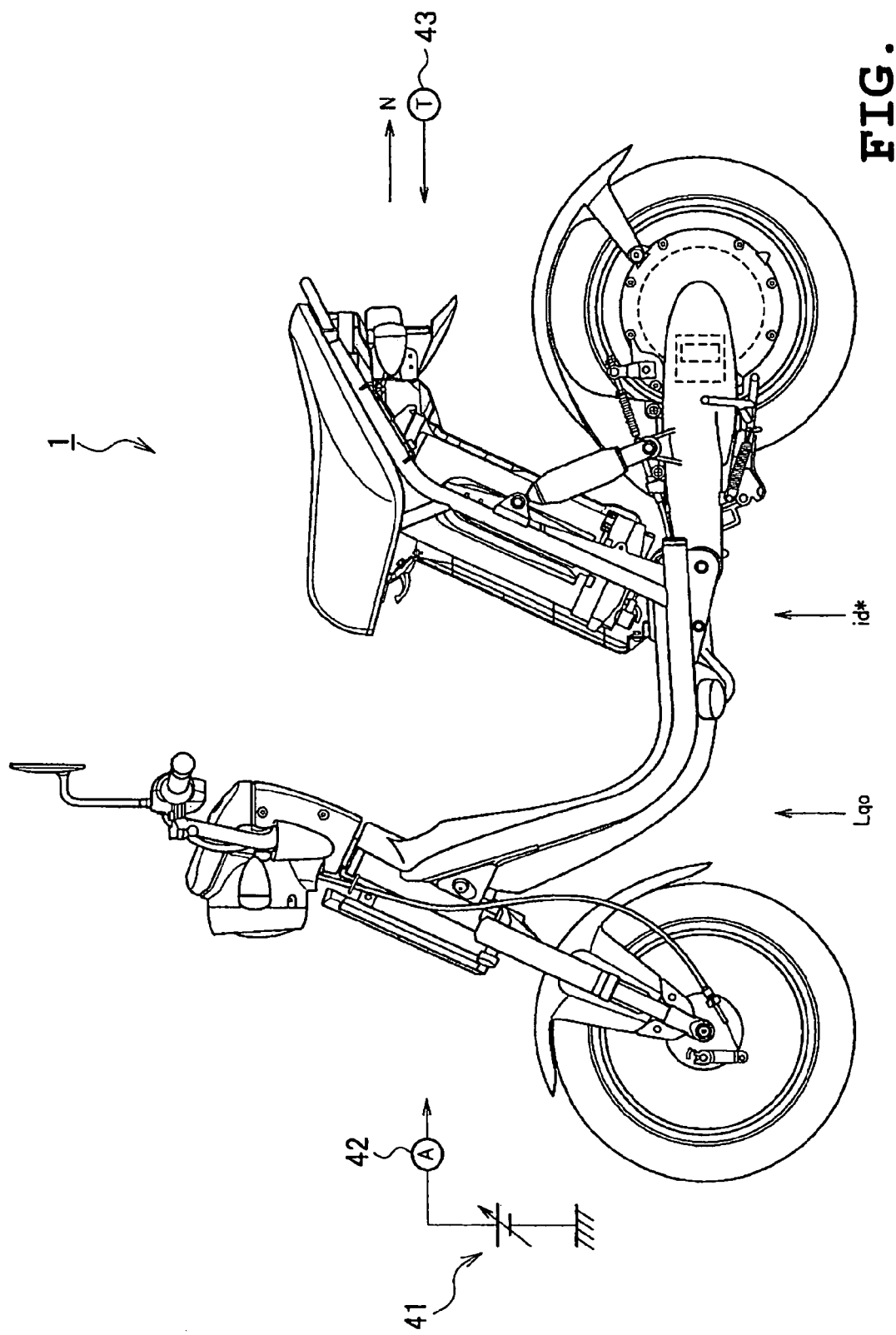
FIG. 6 is an illustration showing an arrangement in sampling data of the N-iq0 and N-id* maps.
Figure 7:
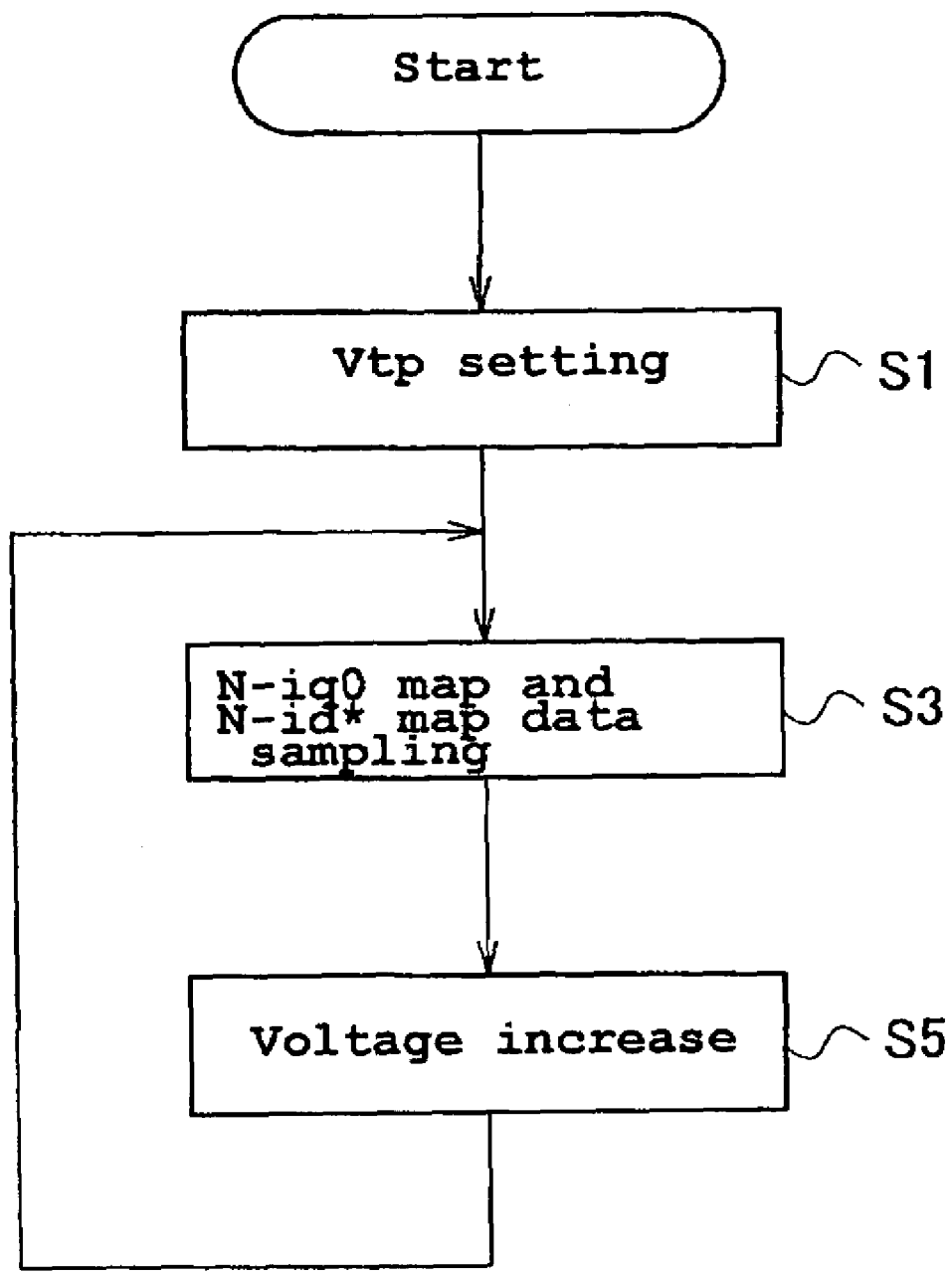
FIG. 7 is a flowchart in sampling the data of the N-iq0 and N-id* maps through the arrangement of FIG. 6.

FIG. 6 is a view showing a method of sampling data constituting the N-iq0 and N-id* maps. FIG. 7 is a flowchart of the method of sampling these data.

As shown in FIG. 6, a DC power source 41 capable of varying the voltage is connected in place of the battery 14 to the electric motorcycle 1 through a DC ammeter 42. The rotational speed N calculated by the rotational speed calculating section 307 is ready to be sampled. Also, to the electric motorcycle 1 is attached a torque meter 43. The before limitation torque current command value iq0 and the field current command value id* can be supplied to the electric motorcycle 1 from the outside.

As shown in FIG. 7, the voltage of the DC power source 41 is set at a battery voltage reference value Vtp (step S1). Then, data of an N-iq0 map (rotational speed-torque current command value map) and an N-id* map (rotational speed-field current command value map) for the battery voltage reference value Vtp are sampled, while the before limitation torque current command value iq0 and the field current command value id* of the electric motor 28 are adjusted such that desired rotational speed-torque characteristics are obtained with the current from the DC power source 41 not exceeding a predetermined current value Ib max (step S3). At the first step S3, data of rotational speed-torque characteristics (N-T characteristics) are also sampled.

The voltage of the DC power source 41 is set at a value larger than the battery voltage reference value Vtp (step S5). Data of an N-iq0 and an N-id* map are sampled for the larger value, while the before limitation torque current command value iq0 and the field current command value id* are adjusted such that the rotational speed-torque characteristics for the battery voltage reference value Vtp sampled at the first step S3 are obtained with the current from the DC power source 41 not exceeding the command value Ib max (step S3).

In this way, data of an N-iq0 map and an N-id* map are sampled for each voltage not smaller than the battery voltage reference value Vtp, and they are stored in the iq0 map storage section 3151 and the id* map storage section 3211, respectively.

As described above, in the electric motorcycle 1, the electric motor control unit 30 controls the electric motor 28 such that rotational speed-torque characteristics are maintained which the electric motor 28 has when the voltage of the battery is at Vbtp, therefore a constant running performance is obtained when the voltage of the battery 14 is not smaller than a predetermined value, while running performance in response to the power source voltage is obtained when the voltage of the battery is smaller than the predetermined value.

In addition, a map of the voltage Vb of the battery, the rotational speed N and the torque component current iq0 of the electric motor 28, or an N-iq0 map, and a map of the voltage Vb of the battery 14, the rotational speed N and the field component current id* of the electric motor 28, or an N-id* map, are provided and control is performed by referring to these maps. Alternatively, only one of the N-iq0 map and the N-id* map is provided and control may be performed by referring to one of these maps.

In the electric motorcycle 1, it is possible that the electric motor control unit 30 performs the same control as described above by mechanically varying the magnetic flux of the electric motor 28. "Mechanically varying" means that, for example, magnetic resistance of the stator constituting the electric motor 28 changes or a gap between the stator and the magnets changes.

Further, the electric motorcycle 1 is provided with a temperature detecting means for detecting a temperature of the battery 14, and the electric motor control unit 30 may control the magnetic flux component current id* of the electric motor 28 using the temperature detected by the temperature detecting means.

A fuel cell may be used in place of the battery 14.

Figure 8:
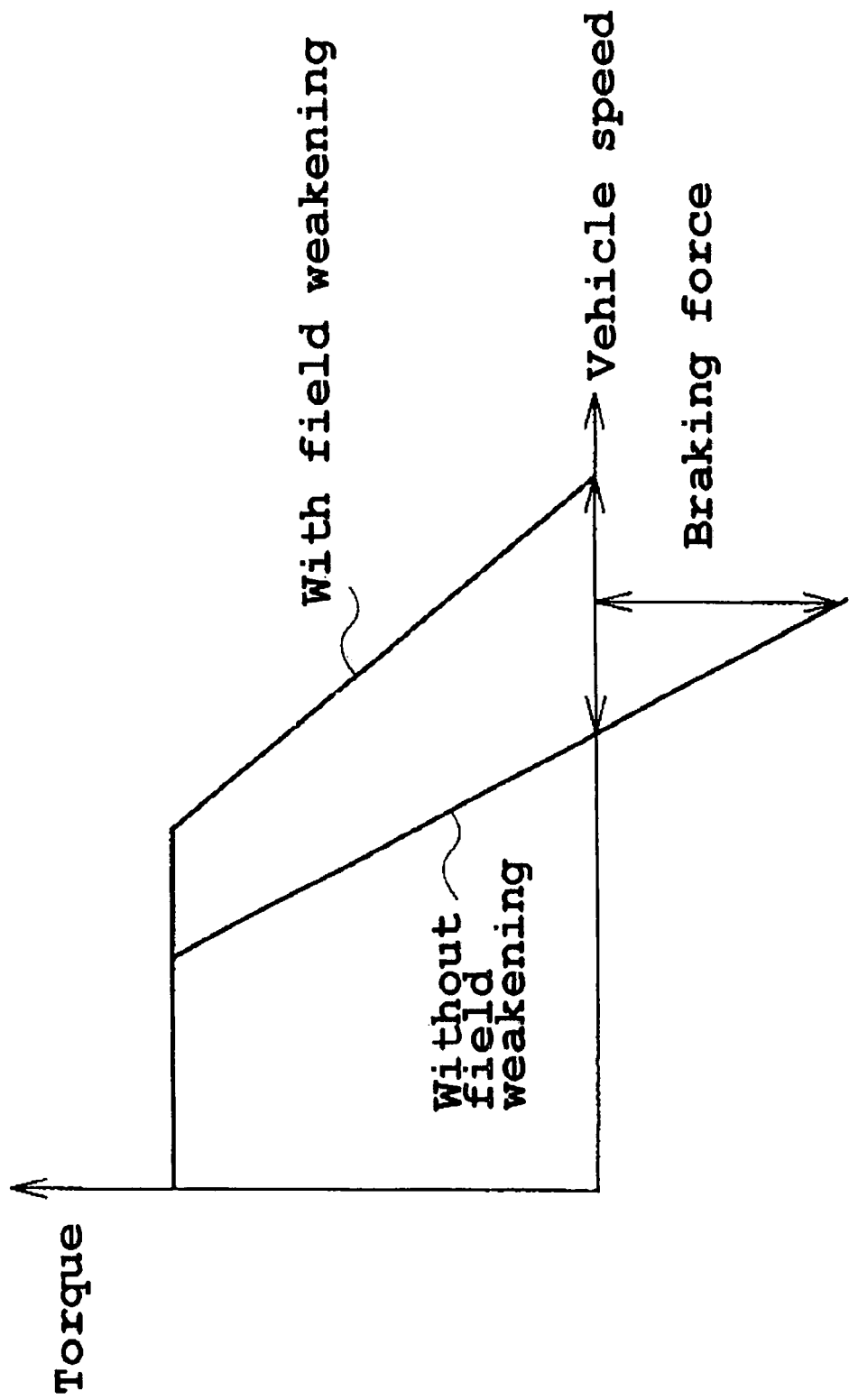
FIG. 8 is a graph showing the difference between characteristics with and without field weakening.
Figure 9:
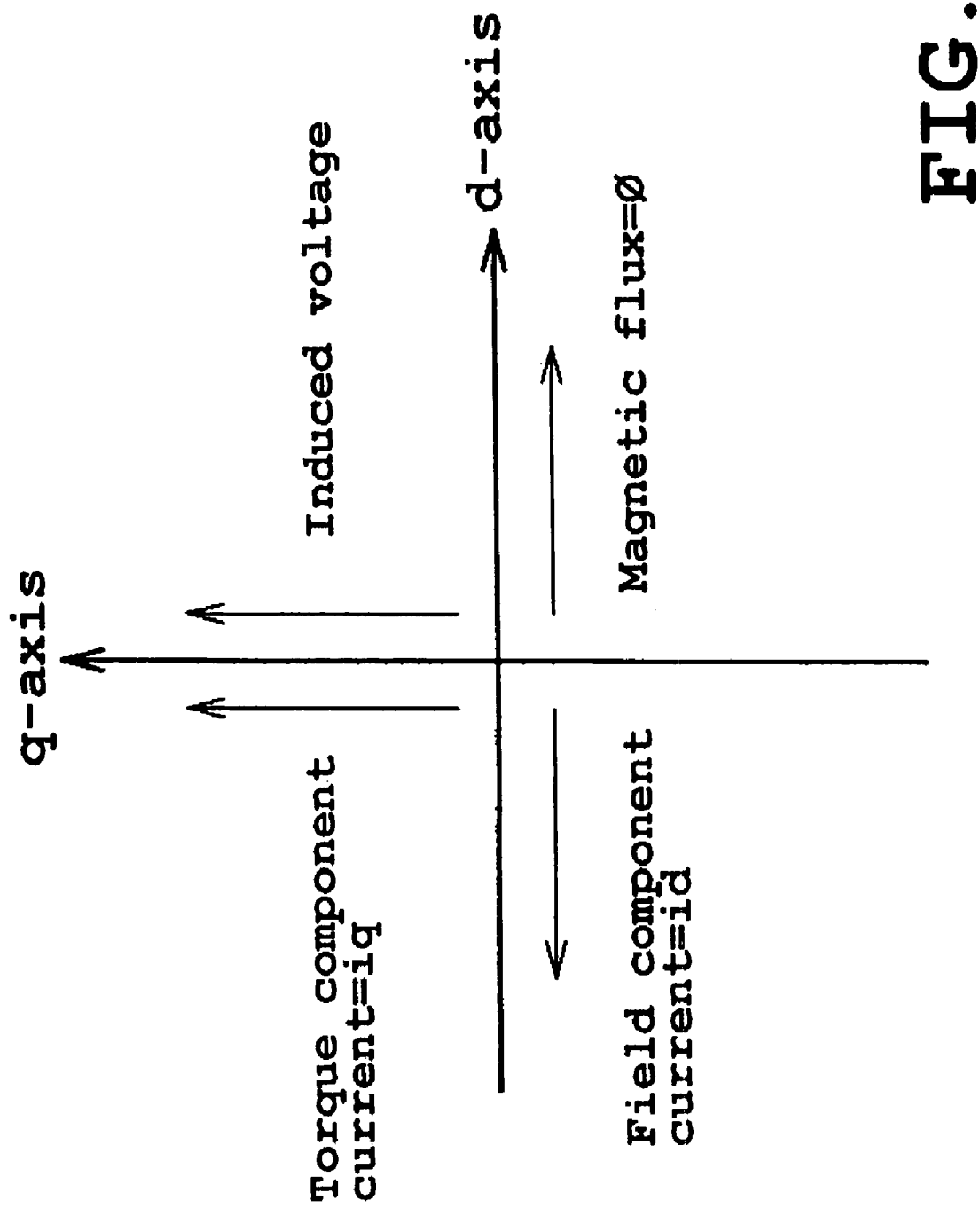
FIG. 9 is an illustration showing the relation between torque component and field component currents.

FIG. 8 is a graph showing the difference between characteristics with and without field weakening. FIG. 9 is an illustration showing the relation between the torque component current and the field component current. The field component is also called the magnetic flux component.

In the electric motorcycle 1 field weakening control is performed. Since the electric motor 28 rotates at a high speed during field weakening, an induced voltage due to the magnetic flux Φ on the d-axis will develop in proportion to the vehicle speed if both of the torque component current (torque current command value iq*) and the field component current (field current command value id*) are reduced to zero when completely closing of the throttle 4A. The induced voltage dΦ/dt causes a current in the braking direction (regenerative current) to flow in the electric motor 28 and the inverter 301, which might destroy the elements of the inverter 301. Also, excessive deceleralation torque (braking force) may be exerted on the passenger.

Therefore, in the electric motorcycle 1, if the throttle 4A is completely closed, only the torque component current is reduced to zero and the field component current is maintained. This will prevent the development of the induced voltage and thus, destruction of the elements and the generation of the braking force.

In the electric motorcycle 1, maps of the field component current are provided for different speeds of the electric motorcycle 1 so that the same induced voltage as the output voltage of the inverter 301 may develop, and the field component current is maintained even if the throttle 4A is completely closed. Here, if a field component current is selected at which the maximum output voltage of the inverter 301 and the induced voltage are the same, the braking force may be produced depending on the variation in quality of the products during production, or the like, therefore the actual field component current is set at a value larger than the foregoing field component current at which the maximum output voltage and the induced voltage are the same.

As described above, in the electric motorcycle 1, a one-way clutch or the like is not needed which is a device for blocking transmission of the braking force to the electric motor 28. That is, the one-way clutch can be materialized electrically. Therefore, an increase in the vehicle's weight and volume due to the provision of the one-way clutch or the like is prevented, thereby creating a lightweight compact electric motorcycle.

Also, in the electric motorcycle 1, standard and power modes can be changed over in response to the position of a main switch for use in starting the electric motorcycle 1. In the electric motorcycle 1, control is performed such that different N-T characteristics are obtained depending on the mode. Specifically, the rotational speed at which the torque begins falling in the standard mode is set at a value lower than that in the power mode. Therefore, in the case of, for example, climbing, the power mode is selected for a sufficient driving force up to a high rotation range. However, the standard mode is selected in the case of, for example, running on a flat road when no large power is needed. That is, mode selections according to these situations are possible. In the electric motorcycle 1, control is performed such that such mode change is possible only when the vehicle is standing, so that mode changes due to careless manipulation can be prevented.

In the motor driven vehicle according to this invention, when the voltage of a power source is a predetermined value or greater, an electric motor control unit controls an electric motor such that the rotational speed-torque characteristics that the electric motor has are maintained when the voltage of the power source is at the predetermined value, so that a constant running performance can be obtained when the power source voltage is larger than the predetermined value.

What is claimed is:

1. A motor driven vehicle comprising:
   an electric motor that drives wheels through a power source; and
   an electric motor control unit that drives the electric motor;
   wherein when a voltage of the power source is a predetermined value or greater, the electric motor control unit controls the electric motor such that rotational speed-torque characteristics that the electric motor has when the voltage of the power source is at the predetermined value are maintained, and,
   wherein the electric motor control unit is provided with at least one of a map of the voltage of the power source, a rotational speed and a torque component current of the electric motor, and a map of the voltage of the power source, wherein the rotational speed and a magnetic flux component current of the electric motor is controlled by performing varying at least one of the torque component current and the magnetic flux component current by referring to the map.

2. The motor driven vehicle of claim 1, further comprising calculating section that calculates a torque current command value.

3. The motor driven vehicle of claim 1, wherein the control by the electric motor control unit is performed by mechanically varying the magnetic flux of the electric motor.

4. The motor driven vehicle of claim 1, wherein the power source is a battery.

5. The motor driven vehicle of claim 4, further comprising an inverter that converts a DC voltage from the battery.

6. The motor driven vehicle of claim 1, further comprising a means for detecting a temperature of the battery.

7. The motor driven vehicle of claim 6, wherein the electric motor control unit is adapted to vary the magnetic flux component current of the electric motor using the temperature detected by the means for detecting a temperature of the battery.

8. The motor driven vehicle of claim 1, further comprising a pulse wave modulation section that generates a pulse wave modulation signal.

9. The motor driven vehicle of claim 1, further comprising a current sensor that detect current values flowing in U-phase and V-phase wires.

10. A method of sampling map data of a motor driven vehicle comprising:
    setting a reference value for a voltage of a DC power source connected to an electric motor for driving a motor driven vehicle;
    sampling data of rotational speed-torque characteristics, a rotational speed-torque current command value map and a rotational speed-field current command value map when the voltage of the DC power source is at a reference value, while a torque current command value and a field current command value of the electric motor are adjusted such that desired rotational speed-torque characteristics are obtained with a current from the DC power source not exceeding a predetermined current value;
    setting a value larger than the reference value for the voltage of the DC power source; and
    sampling data of the rotational speed-torque current command map and the rotational speed-field current command map when the voltage of the DC power source is at the larger value, while the torque current command value and the field current command value are adjusted such that the rotational speed-torque characteristics obtained at the setting a reference value step are obtained with the current from the DC power source not exceeding the predetermined current value.

11. A motor driven vehicle comprising:
means for supplying power;
an electric motor that drives wheels through the means for supplying power; and
an electric motor control unit that drives the electric motor;
wherein when a voltage of the means for supplying power is a predetermined value or greater, the electric motor control unit controls the electric motor such that rotational speed-torque characteristics that the electric motor has when the voltage of the means for supplying power is at the predetermined value are maintained, and
wherein the electric motor control unit is provided with at least one of a map of the voltage of the means for supplying power, a rotational speed and a torque component current of the electric motor, and a map of the voltage of the means for supplying power, wherein the rotational speed and a magnetic flux component current of the electric motor is controlled by performing varying at least one of the torque component current and the magnetic flux component current by referring to the map.

12. The motor driven vehicle of claim 11, further comprising a current sensor that detects current values flowing in U-phase and V-phase wires.

13. The motor driven vehicle of claim 11, further comprising a pulse wave modulation section that generates a pulse wave modulation signal.

14. The motor driven vehicle of claim 11, wherein the control by the electric motor control unit is performed by mechanically varying the magnetic flux of the electric motor.

15. The motor driven vehicle of claim 11, wherein the means for supplying power is a battery.

16. The motor driven vehicle of claim 15, further comprising an inverter that converts a DC voltage from the battery.

17. The motor driven vehicle of claim 11, further comprising a means for detecting a temperature of the means for supplying power.

18. The motor driven vehicle of claim 17, wherein the electric motor control unit is adapted to vary the magnetic flux component current of the electric motor using the temperature detected by the means for detecting a temperature of the means for supplying power.

* * * * *